Figure 1:
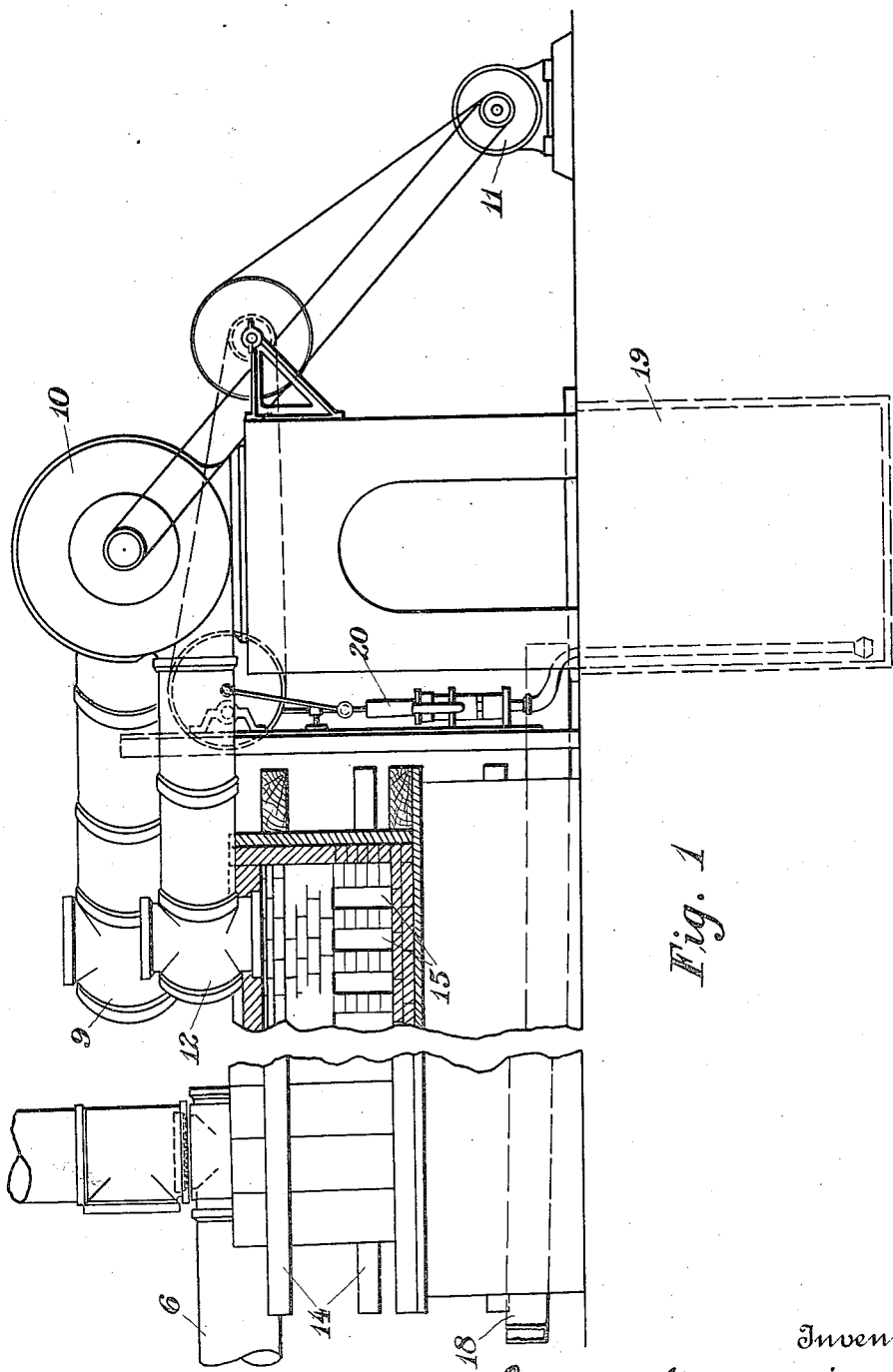

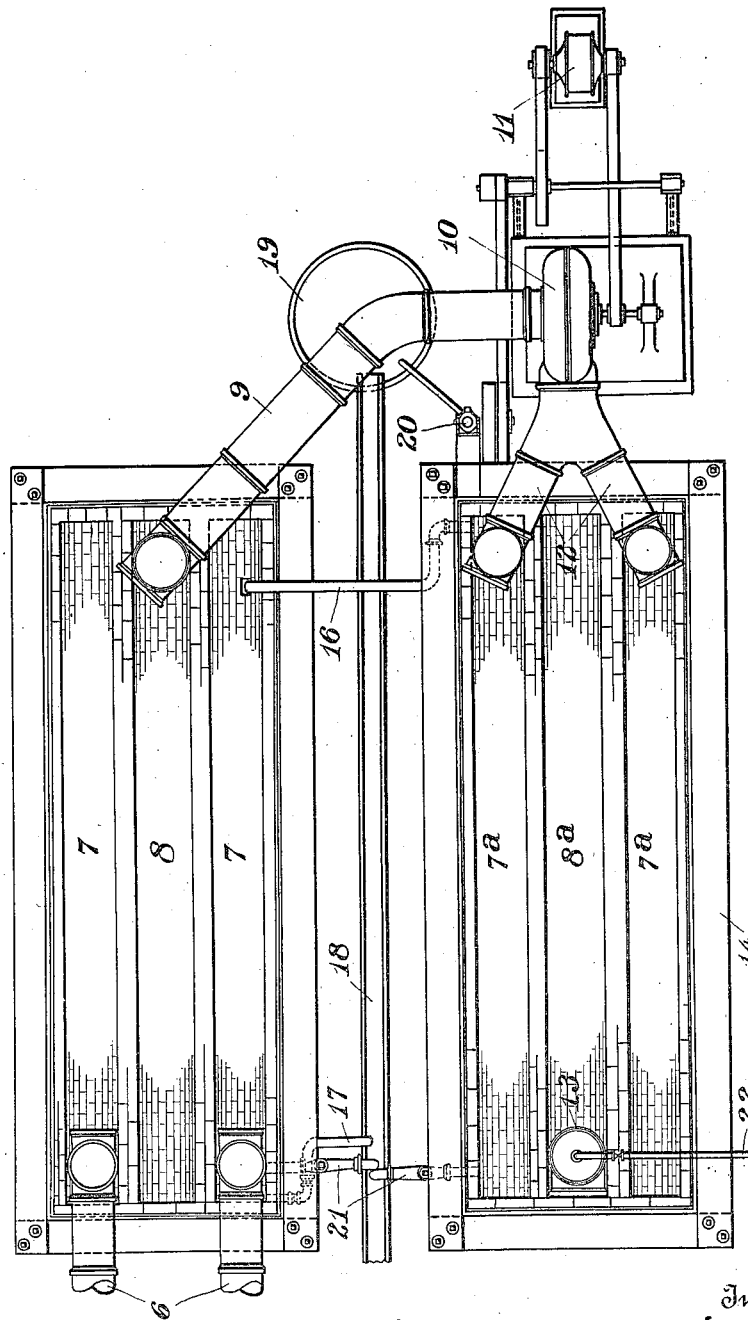

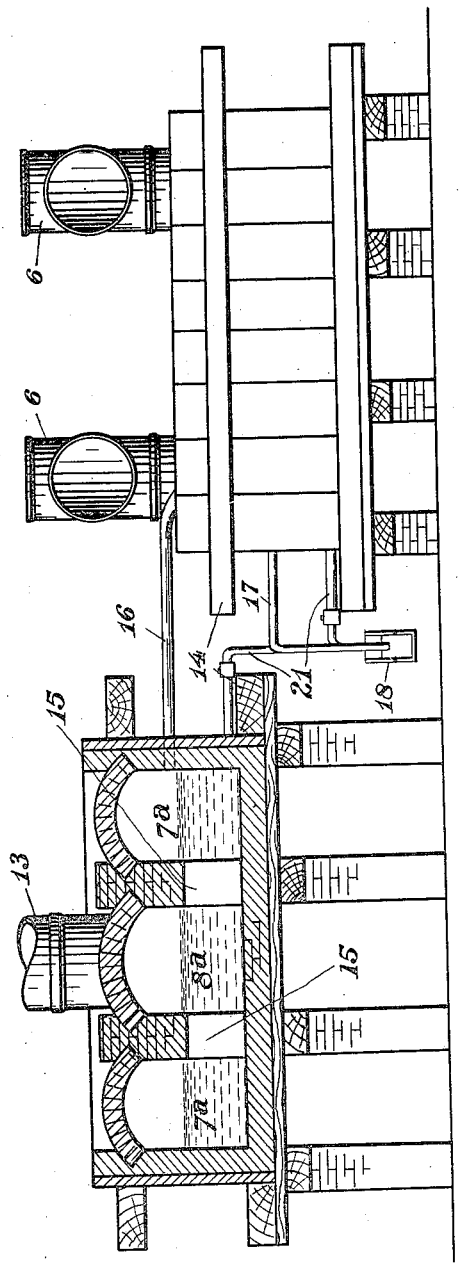

UNITED STATES PATENT OFFICE.

INGENUIN HECHENBLEIKNER, OF CHARLOTTE, NORTH CAROLINA, ASSIGNOR TO CHEMICAL CONSTRUCTION COMPANY, OF CHARLOTTE, NORTH CAROLINA, A CORPORATION OF NORTH CAROLINA.

RECOVERY PROCESS FOR WASTE GASES.

1,297,464.  Specification of Letters Patent.  Patented Mar. 18, 1919.

Application filed October 26, 1918.  Serial No. 259,780.

*To all whom it may concern:*

Be it known that I, INGENUIN HECHENBLEIKNER, a citizen of the United States, residing at Charlotte, in the county of Mecklenburg and State of North Carolina, have invented certain new and useful Improvements in Recovery Processes for Waste Gases, of which the following is a specification.

Mineral phosphates usually contain 5 per cent. to ten per cent. calcium fluorid ($CaF_2$). In acidulating ground phosphate rock, this calcium fluorid is decomposed by the sulfuric acid. The amount of the decomposition depends upon the temperature of the mixture and the mechancial condition of same. At an average in acidulating about 50 per cent. to 75 per cent. of the calcium fluorid is decomposed and the fluorin escapes as a silicon fluorid ($SiF_4$). This silicon fluorid is of course not a pure gas. It contains, besides water vapors, $CO_2$, $SO_2$ and $SO_3$, some organic vapors and also some mechanical dust from the mixture. This silicon fluorid brought in contact with water is decomposed and forms mainly hydrofluosilicic acid ($N_2SiF_6$), gelatinous hydrosilicic acid ($H_2SiO_3$) and a small amount of hydrofluoric acid (HF). This reaction is very slow and is quicker with cold water than with steam. The reaction is considerably quickened and more efficient if a solution containing gelatinous hydrosilicic acid, water and hydrofluosilicic acid, are brought in intimate contact with the silicon fluorid gas.

Upon this principle is based my process for absorbing waste gases from acidulating plants. For this reason my process is much more efficient in operation and construction than that employing the ordinary spray towers. Besides, the product gained in this way is of commercial value and not a total loss as in the ordinary tower system.

The chemical reactions which take place in the acidulation and absorption are as follows:

(1) 

(2) 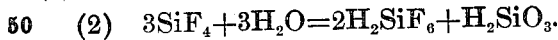

(3) 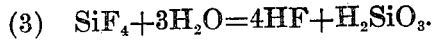

(4) 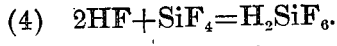

The solution gained consists mainly of water and hydrofluosilicic acid with gelatinous hydrosilicic acid in suspension. The acids can be separated by simply filtering, giving a diluted solution of hydrofluosilicic fluoric acid. The concentration of the hydrofluosilicic acid obtained depends largely on the concentration of the waste gases from the acidulating plant. If the acidulating plant is well designed, so as not to have too many air leaks, the waste gases will be of good concentration and also the recovered hydrofluosilicic acid up to 20 per cent. strength can be produced economically.

The recovered acid can be used a. follows:

1. In connection with diluted sulfuric acid for mixing with ground phosphate rock and making available phosphoric acid according to the formula.

In this case, it is not necessary to separate the hydrofluosilicic acid from the hydrosilicic acid. The whole solution can be mixed with diluted sulfuric acid and used directly in the ordinary mixer for producing available phosphoric acid.

2. The hydrofluosilicic acid can be separated from the hydrosilicic acid by filtering it through an ordinary sand filter. The hydrofluosilicic acid obtained in this way can be used as follows:

This diluted acid can be concentrated to produce concentrated hydrofluosilicic acid, which is used in industry for many purposes, and permits various salts of the hydrofluosilicic acid, such as sodium-fluosilicate, calcium silicic fluorid, artificial cryolith, which salts are used mainly in the pottery and enamel industry.

The apparatus for the performance of this process is disclosed in the accompanying drawings, in which Figure 1 is a side elevation of the plant, partly in section; Fig. 2 is a plan; Fig. 3 is a partial end elevation and cross-section.

The structure will be apparent from the following description of the method of operation. The gases are admitted through inlet pipes 6 to one end of a pair of masonry tunnels or chambers 7 from which it flows laterally into an intermediate or middle chamber 8 from which it is drawn through a pipe 9 by a fan 10 driven by a motor 11 and forced through pipes 12 into another pair of masonry chambers or tunnels 7ª from which it passes into an intermediate chamber 8ª and is finally delivered to a gas outlet 13 for the waste gases. The chambers 7ª and 8ª are supported on suitable foundations and may be inclosed by frames 14, and contain liquid to a depth slightly above the top of transverse openings 15 in the partition walls between the chambers. The openings extend the full length of the chambers, and under the suction or pressure of the fan the gases are drawn under the surface of the liquid, through the side openings, bubbling up through the liquid, thereby causing the absorption for permitting the reactions indicated, the action being somewhat similar to that in a Kessler apparatus. The chambers on the pressure side of the apparatus are somewhat higher than on the suction side, so that an overflow of the liquid is permitted through a pipe 16 from one of the chambers 7ª to one of the chambers 7, and a final flow of the recovered acid from the chamber 7 is permitted through a pipe 17 into a trough 18 which conducts the acid to a stoneware vat 19 from which it may be lifted by pump 20. Pipes 21 also permit drainage of the chambers to the trough 18 when desired. Water is supplied to the chambers from a pipe 22 at the outlet end of the final chamber 8ª.

As indicated above, the level of the liquid in the chambers is kept just above the top of the openings 15 so as to allow an effective scrubbing of the gases as they pass from one to the other. The flow of liquid from the outlet chamber to the inlet chamber causes repeated contact of the gas and liquid, which strengthens the acid to the proper concentration before it leaves the apparatus. This liquid, as above indicated, comprises a solution containing the acids and water and the chemical reaction with the partially saturated liquid is considerably quickened and is more efficient than if clear water were used in a spray or the like. This quality of the fluorin acids is therefore a feature embodied in the present process.

The products obtained in this way from the waste gas recovery are of considerable value and result in a saving of material often heretofore wasted or discharged into the air, such a discharge having well-known objections with respect to surrounding country.

1. The method of producing fluoric acids, consisting in passing waste gases containing a fluoric compound through a body of liquid holding a hydrosilicic acid in solution.

2. The method of producing hydrofluosilicic acid, consisting in passing gases containing silicon fluorid in contact with a solution containing an acid of silicon.

3. The method of utilizing the waste gases from acid phosphate plants, consisting in passing said gases through a solution containing an acid of silicon.

4. The method of purifying waste gases from acid phosphate plants, consisting in passing said gases in contact with a mixture containing gelatinous hydrosilicic acid, water and hydrofluosilicic acid.

In testimony whereof I affix my signature in presence of two witnesses.

INGENUIN HECHENBLEIKNER.

Witnesses:
A. M WEBB,
W. A. CRANDALL.